United States Patent
Chan et al.

(10) Patent No.: US 9,318,137 B1
(45) Date of Patent: Apr. 19, 2016

(54) DATA STORAGE DEVICE EXECUTING RETRY OPERATION BY BUFFERING SIGNAL SAMPLES AT DIFFERENT RADIAL OFFSETS

(71) Applicant: Western Digital Technologies, Inc., Irvine, CA (US)

(72) Inventors: Tom S. Chan, San Marino, CA (US); Thao Hieu Banh, Lake Forest, CA (US); Derrick E. Burton, Ladera Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/799,536

(22) Filed: Jul. 14, 2015

Related U.S. Application Data

(60) Provisional application No. 62/133,105, filed on Mar. 13, 2015.

(51) Int. Cl.
  *G11B 27/36* (2006.01)
  *G11B 20/10* (2006.01)
  *G11B 5/55* (2006.01)

(52) U.S. Cl.
  CPC .......... *G11B 5/5526* (2013.01); *G11B 20/10231* (2013.01)

(58) Field of Classification Search
  CPC ........... G11B 20/10231; G11B 5/5526; G11B 20/10009; G11B 5/09; G11B 2220/90; G11B 27/36; G11B 2220/20; G11B 27/3027
  USPC ............................... 360/31, 39, 48, 65, 46, 68
  See application file for complete search history.

(56) References Cited

U.S. PATENT DOCUMENTS

| | | |
|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |

(Continued)

*Primary Examiner* — Nabil Hindi

(57) ABSTRACT

A data storage device is disclosed comprising a head actuated over a disk. The head is positioned at a first radial location over the disk and at least part of a codeword on the disk is read to generate first signal samples. A first quality metric is generated for the first signal samples. The head is positioned at a second radial location over the disk different from the first radial location and at least part of the codeword is read to generate second signal samples. A second quality metric is generated for the second signal samples. A first subset of the first signal samples is combined with a second subset of the second signal samples based on the first and second quality metrics to generate a combined set of signal samples. An attempt is made to decode the codeword based on the combined set of signal samples.

20 Claims, 6 Drawing Sheets

(56) References Cited

U.S. PATENT DOCUMENTS

| | | |
|---|---|---|
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,369,974 B1 | 4/2002 | Asgari et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,693,764 B1 | 2/2004 | Sheh et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,714,371 B1 | 3/2004 | Codilian |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,033 B1 | 5/2004 | Codilian et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,780 B1 | 8/2004 | Codilian |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 * | 2/2006 | Codilian et al. ......... G11B 5/02 360/46 |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |

(56) References Cited

U.S. PATENT DOCUMENTS

| | | |
|---|---|---|
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,535 B2 | 8/2006 | Kim et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,206,990 B2 | 4/2007 | Su et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,602,576 B2 | 10/2009 | Yoshida |
| 7,602,863 B2 | 10/2009 | Kovintavewat et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,978,428 B2 | 7/2011 | Cho et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |

(56) References Cited

U.S. PATENT DOCUMENTS

| | | |
|---|---|---|
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,810,940 B2 | 8/2014 | Jin et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,922,931 B1 | 12/2014 | Ji et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

FIG. 4C

| SEGMENT: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 30 | | | | | | | | | | | | | | |
| 25 | | | | | | | | | | | | | | |
| 20 | | | | | | | | | | | | | | |
| 15 | | | | | | | | | | | | | | |
| 10 | | | | | | 100 | 100 | | 150 | 100 | 150 | 100 | 100 | 150 |
| 5 | 20 | 20 | 75 | 50 | 75 | 40 | 40 | 40 | 100 | 40 | 100 | 40 | 40 | 100 |
| 0 | 100 | 100 | 150 | 75 | 150 | 20 | 20 | 20 | 40 | 20 | 40 | 20 | 20 | 40 |
| -5 | | 150 | 200 | 150 | 200 | | | 40 | | | | | | |
| -10 | | | | | | | | | | | | | | |
| -15 | | | | | | | | | | | | | | |
| -20 | | | | | | | | | | | | | | |
| -25 | | | | | | | | | | | | | | |
| -30 | | | | | | | | | | | | | | |
| -35 | | | | | | | | | | | | | | |

FIG. 4D

| SEGMENT: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 30 | | | | | | | | | | | | | | |
| 25 | | | | | | | | | | | | | | |
| 20 | | | | | | | | | | | | | | |
| 15 | 50 | 20 | 20 | 20 | 30 | | | | | | | | | |
| 10 | 20 | 20 | 75 | 50 | 75 | 150 | 150 | 100 | 255 | 150 | 255 | 150 | 150 | 255 |
| 5 | 20 | 100 | 150 | 75 | 150 | 100 | 100 | 40 | 150 | 100 | 150 | 100 | 100 | 150 |
| 0 | 100 | 150 | 200 | 150 | 200 | 40 | 40 | 20 | 100 | 40 | 100 | 40 | 40 | 100 |
| -5 | | | | | | 20 | 20 | 40 | 40 | 20 | 40 | 20 | 20 | 40 |
| -10 | | | | | | | | | | | | | | |
| -15 | | | | | | | | | | | | | | |
| -20 | | | | | | | | | | | | | | |
| -25 | | | | | | | | | | | | | | |
| -30 | | | | | | | | | | | | | | |
| -35 | | | | | | | | | | | | | | |

DATA STORAGE DEVICE EXECUTING RETRY OPERATION BY BUFFERING SIGNAL SAMPLES AT DIFFERENT RADIAL OFFSETS

CROSS-REFERENCE TO RELATED APPLICATIONS

This application claims priority to provisional U.S. Patent Application Ser. No. 62/133,105, filed on Mar. 13, 2015, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 4A-4D illustrate an embodiment wherein the codeword is read at multiple radial locations and the best subset of signal samples at each radial location are used to decode the codeword.

DETAILED DESCRIPTION

Figure 2A:
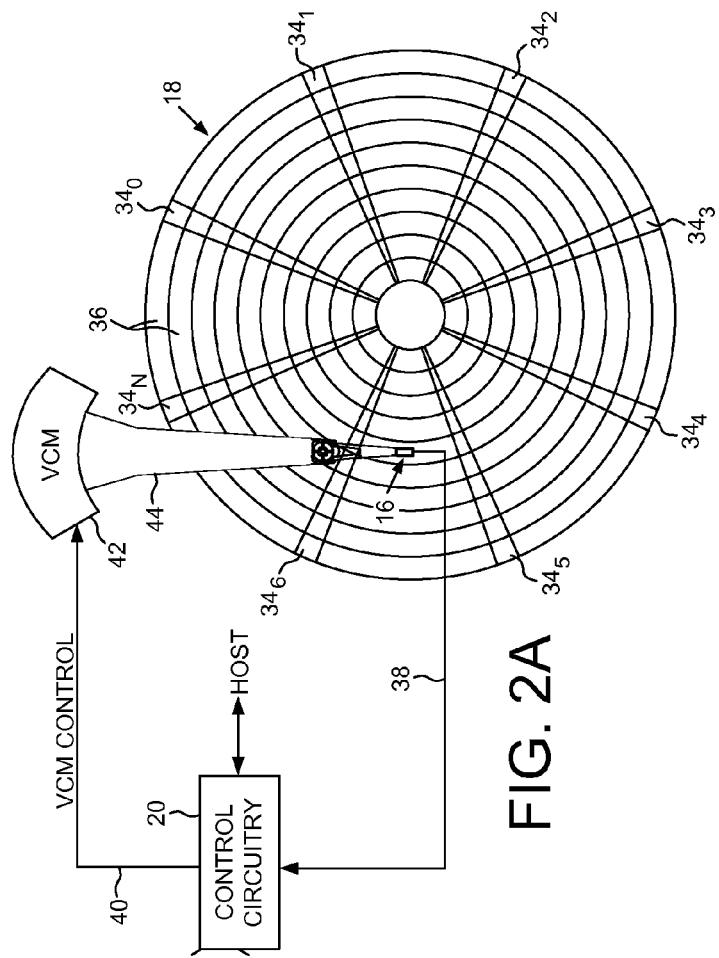
FIG. 2A is a data storage device in the form of a disk drive according to an embodiment comprising a head actuated over a disk.
Figure 2B:
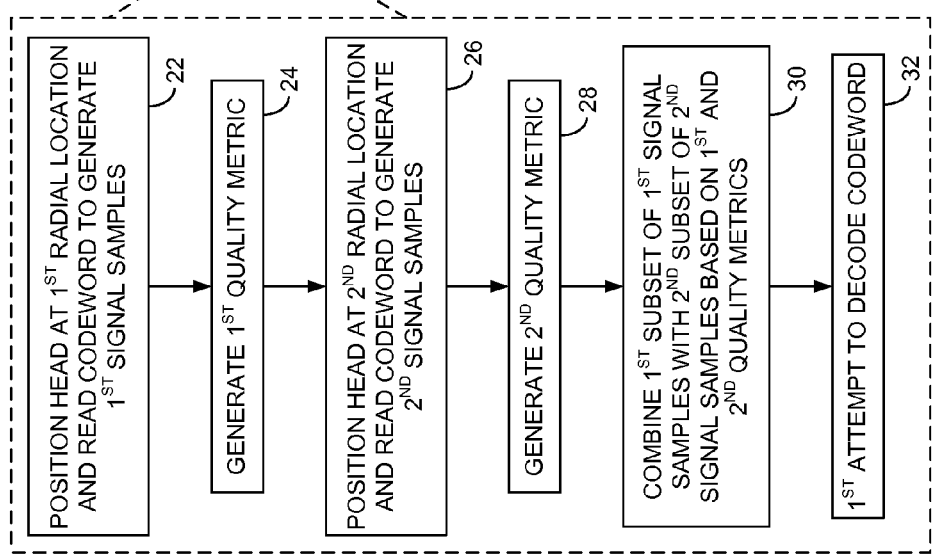
FIG. 2B is a flow diagram according to an embodiment wherein a codeword is read at multiple radial locations and the resulting signal samples merged to decode the codeword.

FIG. 2A shows a data storage device in the form of a disk drive according to an embodiment comprising a head 16 actuated over a disk 18. The disk drive further comprises control circuitry 20 configured to execute the flow diagram of FIG. 2B, wherein the head is positioned at a first radial location over the disk and at least part of a codeword on the disk is read to generate first signal samples (block 22). A first quality metric is generated for the first signal samples (block 24). The head is positioned at a second radial location over the disk different from the first radial location and at least part of the codeword is read to generate second signal samples (block 26). A second quality metric is generated for the second signal samples (block 28). A first subset of the first signal samples is combined with a second subset of the second signal samples based on the first and second quality metrics to generate a combined set of signal samples (block 30). An attempt is made to decode the codeword based on the combined set of signal samples (block 32).

Figure 1:
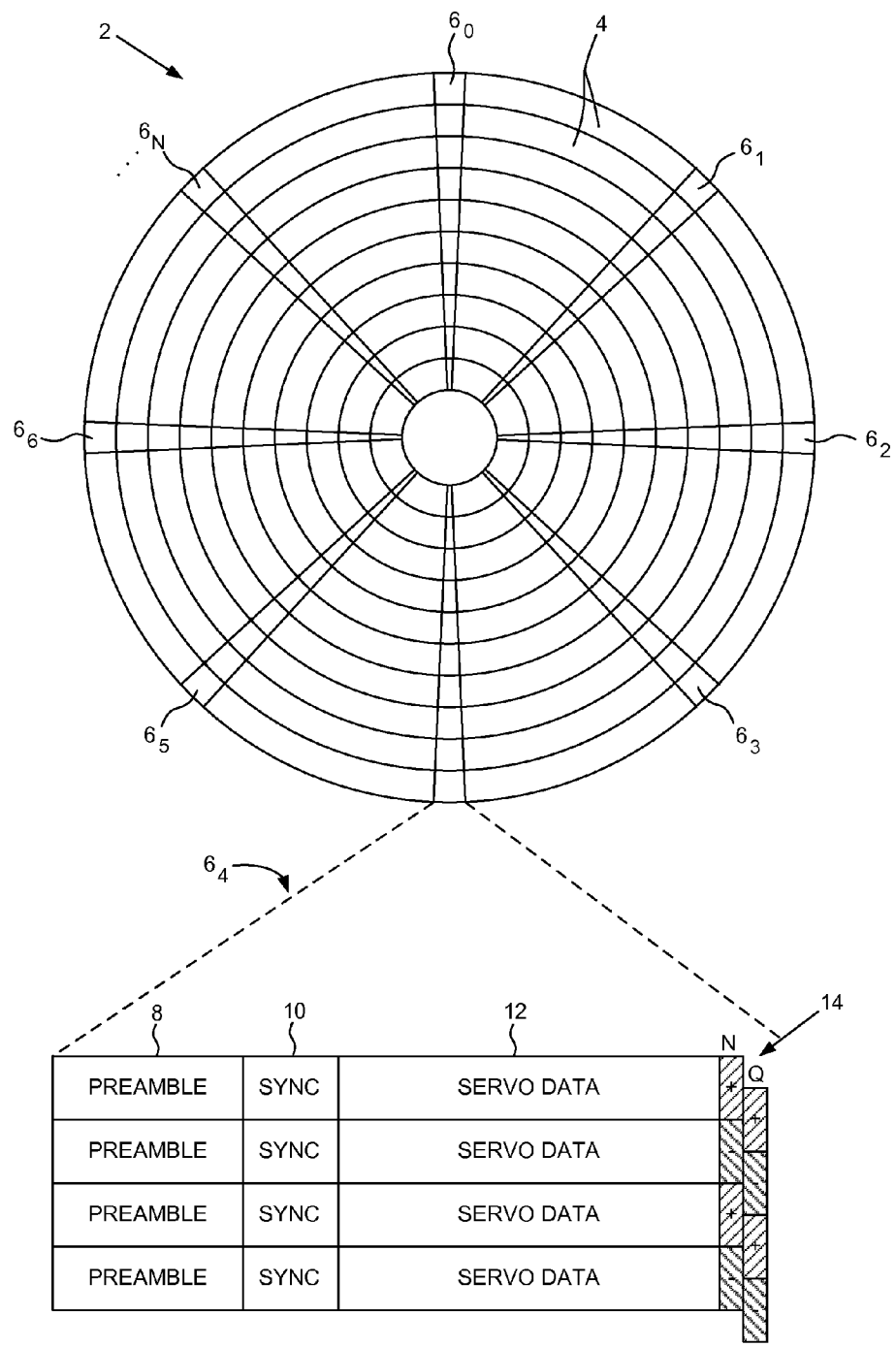
FIG. 1 is a prior art disk format comprising a plurality of tracks defined by servo sectors.

In the embodiment of FIG. 2A, the disk 18 comprises a plurality of servo sectors $34_0$-$34_N$ that define a plurality of servo tracks 36, wherein data tracks are defined relative to the servo tracks at the same or different radial density. The control circuitry 20 processes a read signal 38 emanating from the head 16 to demodulate the servo sectors $34_0$-$34_N$ and generate a position error signal (PES) representing an error between the actual position of the head and a target position relative to a target track. A servo control system in the control circuitry 20 filters the PES using a suitable compensation filter to generate a control signal 40 applied to a voice coil motor (VCM) 42 which rotates an actuator arm 44 about a pivot in order to actuate the head 16 radially over the disk 18 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figures 3A, 3B:
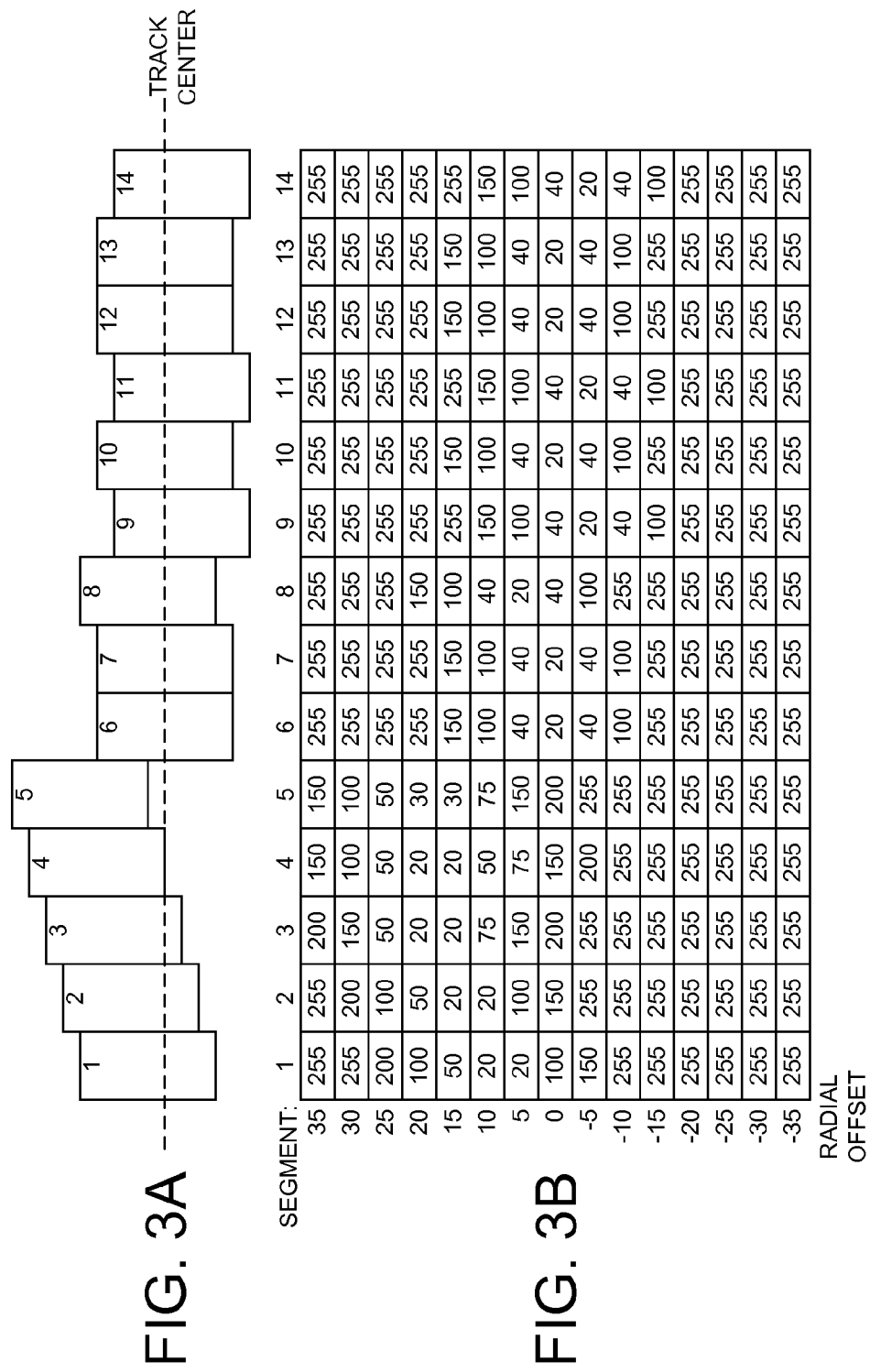
FIG. 3A illustrates an embodiment wherein at least part of a codeword is written off-track rendering it difficult to decode when read from a single radial location.
FIG. 3B illustrates a quality metric generated over the signal samples of the codeword when read at different radial locations.

In one embodiment, during a write operation the control circuitry 20 encodes the write data into a codeword that is written to a data track on the disk 18. Any suitable encoding technique may be employed, such as a suitable block code (e.g., Reed-Solomon) or an iterative code (e.g., low density parity check (LDPC)). As the codeword is being written to the disk 18, the head 16 may deviate from the centerline of the data track due, for example, to a vibration affecting the disk drive. As a result, at least part of the codeword may be written too far off-track to allow the codeword to be successfully decoded during a single revolution read operation (i.e., by reading the codeword at a single radial location). FIG. 3A shows an example codeword written to a data track, wherein the codeword comprises multiple segments (14 segments in this example), where each segment comprises any suitable size (e.g., a single bit, a byte, or several bytes). In the example of FIG. 3A, a vibration affecting the disk drive causes the head to deviate from the data track causing the first five segments to be written progressively further away from the centerline. Eventually the control circuitry may abort the current write operation (during the current revolution of the disk) and then later finish writing the remaining segments of the codeword after the vibration dissipates. When attempting to read the codeword shown in FIG. 3A, the control circuitry may initially read the centerline of the data track and attempt to decode the codeword. However, the signal samples generated over one or more of the first five segments may be too low a quality to enable the codeword to be successfully decoded.

When a codeword is not recoverable by reading the centerline of a data track, the prior art has attempted to recover the codeword by rereading the data track at a radial offset. Referring to the example of FIG. 3A, the prior art may attempt to reread the codeword with a radial offset toward the top of the codeword so that on average the quality of the signal samples generated over the entire codeword improves, thereby increasing the chance of a successful decode. However, in some cases the average quality of the signal samples may still be insufficient to render the codeword recoverable even when the head is positioned at the optimal radial location.

FIG. 3B illustrates a quality metric generated for each segment of the codeword shown in FIG. 3A (i.e., for the signal sample(s) corresponding to each segment of the codeword) when the head is positioned at different radial locations relative to a centerline of the data track. In this example, a lower number for the quality metric corresponds to a better quality (a quality metric of 255 represents the worst quality). In this example, the best average quality metric may be generated when reading the codeword at an offset of +5 or possibly at +10, but the codeword may still be unrecoverable if read at either of these offsets (i.e., using all of the signal samples read at a single radial offset). Accordingly, in one embodiment the codeword is read at multiple radial locations and a subset of the resulting signal samples at each radial location are merged based on the resulting quality metrics. The combined set of signal samples may have a sufficiently high quality to enable successful decoding of the codeword.

Figure 4A:
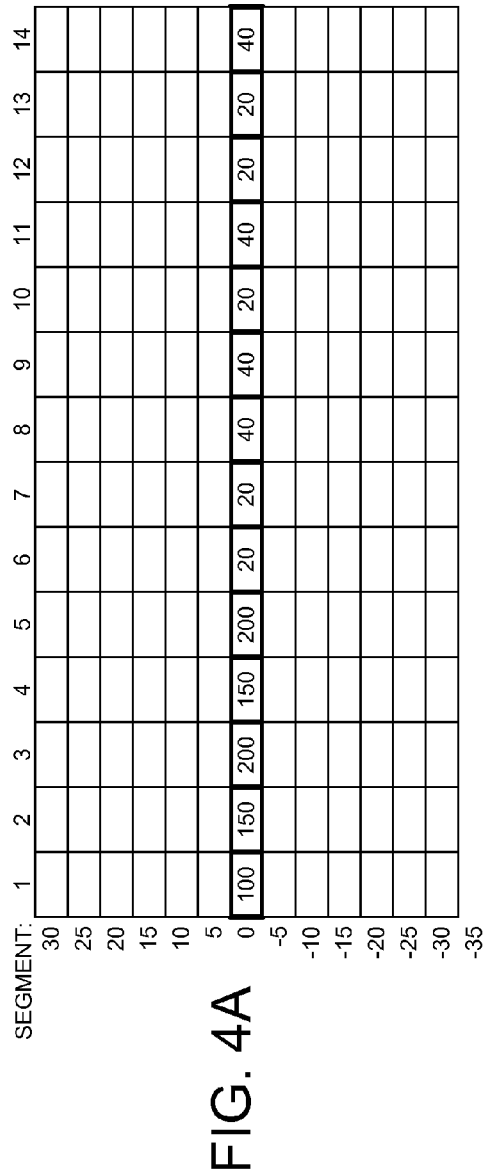
Figure 4B:
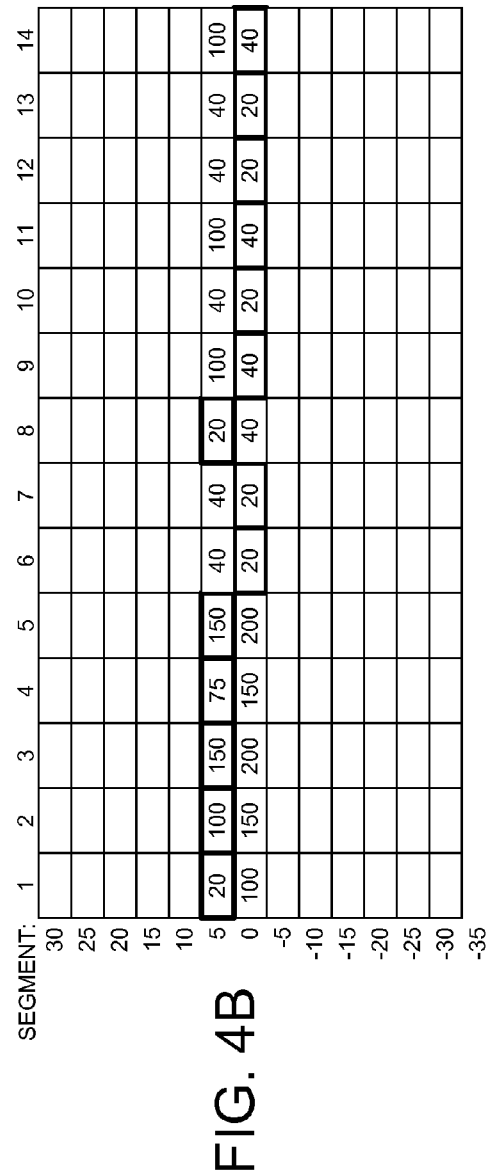

FIGS. 4A-4D illustrate an example embodiment wherein the signal sample(s) representing each segment of the codeword shown in FIG. 3A are progressively updated by reading the codeword at different radial locations until the combined set of signal samples enables the successful decoding of the codeword. FIG. 4A shows the quality metrics generated over each segment of the codeword when the head is positioned over the centerline of the data track. The quality metrics corresponding to the first five segments may be too poor to enable successful decoding, so the head is positioned at a radial offset of +5 to reread the codeword as illustrated in FIG. 4B. The resulting quality metrics generated for each segment are compared to the quality metrics generated in FIG. 4A. The signal sample(s) corresponding to the better comparable quality metrics are used to replace the corresponding signal sample(s) previously generated. This is illustrated by the highlighted segments shown in FIG. 4B wherein the signal sample(s) corresponding to segments 1-5 and 8 replace the signal samples generated during the previous read operation. A second attempt is then made to decode the codeword based on the combined set of signal samples. If the codeword is still unrecoverable, the process is repeated by rereading the codeword at a radial offset of +10 as shown in FIG. 4C. The signal samples corresponding to the better quality metrics replace the previously stored signal samples and another attempt is made to recover the codeword. If the codeword is still unrecoverable, the process is repeated by rereading the codeword at a radial offset of +15 as shown in FIG. 4D. The signal samples corresponding to the better quality metrics replace the previously stored signal samples and another attempt is made to recover the codeword. Eventually the combined set of signal samples may achieve a sufficiently high quality to enable the successful decoding of the codeword.

In one embodiment, the control circuitry may adjust the radial offset for the head in an arbitrary direction away from the centerline of the data track during the reread operations. The control circuitry may then evaluate the quality metrics for the signal samples to determine whether the quality metrics are improving. If the quality metrics are degrading, the control circuitry may reverse the direction of the radial offset before continuing with the iterations. Referring to the example of FIGS. 4A-4D, the control circuitry may initially offset the head toward the minus direction away from the centerline of the data track (e.g., starting at a radial offset of −5). As shown in FIG. 3B, the resulting quality metrics will eventually become worse than the previously generated quality metrics, and therefore the control circuitry may reverse the direction of offset before proceeding.

In one embodiment, the control circuitry may generate the combined set of signal samples by reading the codeword with both positive and negative offsets. Referring to the example of FIG. 3B, the control circuitry may first read the codeword with an offset of −5 and then replace the signal sample(s) corresponding to segments 9, 11 and 14 since the quality metric would improve from 40 to 20. The control circuitry may then read the codeword at an offset of −10 to determine that the quality metrics are not improving for any of the segments. The control circuitry may then reverse the direction of the offset to update the combined set of signal samples as described above with reference to FIGS. 4A-4D.

Figure 5A:
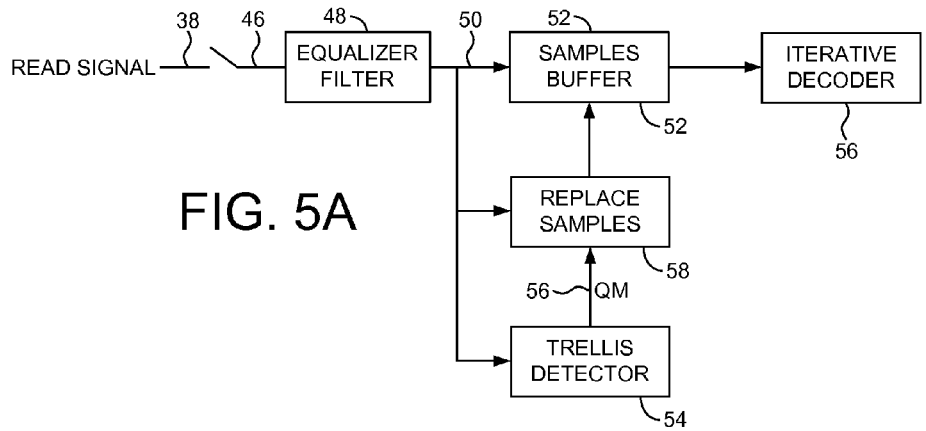
FIG. 5A shows control circuitry according to an embodiment wherein the quality metric is generated based on a branch metric of a trellis type sequence detector.

The control circuitry may generate any suitable metric when reading a codeword from the disk. FIG. 5A shows control circuitry according to an embodiment wherein the read signal 38 is sampled to generate signal samples 46. The signal samples 46 are filtered with an equalizer filter 48 which may, for example, operate to configure the transfer function of the recording channel into a suitable partial response (PR) recording channel (e.g., a PR4 recording channel). The equalized signal samples 50 corresponding to a codeword are stored in a samples buffer 52 and processed by a suitable trellis type sequence detector 54 (e.g., a Viterbi sequence detector). In one embodiment, the trellis type sequence detector 54 may provide preliminary decisions about the recorded data to facilitate timing recovery and gain control. In one embodiment, the trellis type sequence detector 54 may also generate the quality metrics 56 such as shown in FIG. 3B.

During an initial read of a codeword (e.g., at the data track centerline), the equalized signal samples 50 stored in the samples buffer 52 may be processed by a suitable iterative decoder 58, such as a LDPC decoder, or in another embodiment, a soft-output Viterbi algorithm (SOVA) detector in combination with an LDPC decoder. If the decoding fails, the control circuitry rereads the codeword at a radial offset and the trellis type sequence detector 54 generates the quality metrics 56 for the signal samples. At block 58 the control circuitry replaces the signal samples in the samples buffer 52 when the corresponding quality metric exceeds the previously generated quality metric as described above. The updated combined set of signal samples stored in the samples buffer 52 are again processed by the iterative decoder 58 and the process repeated until the codeword is recoverable (or deemed unrecoverable).

Figure 5B:
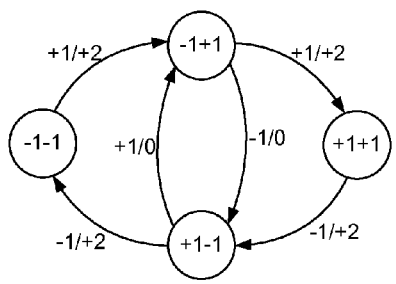
FIGS. 5B and 5C illustrate operation of a trellis type sequence detector according to an embodiment.
Figure 5C:
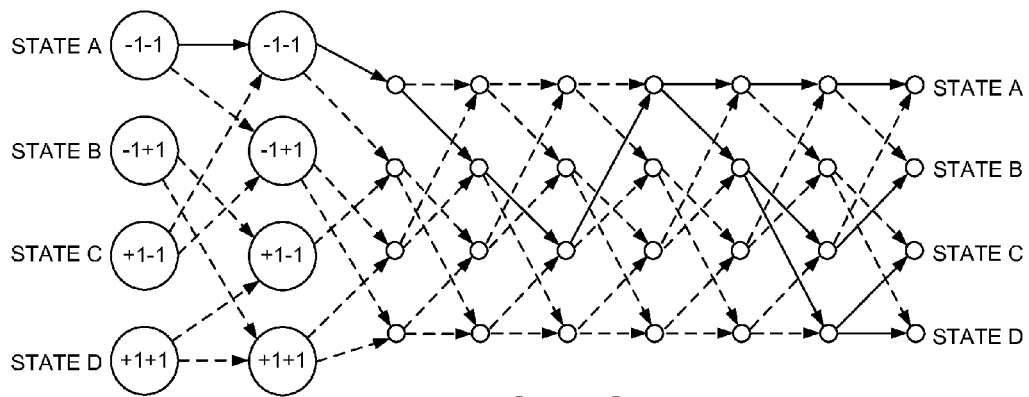

FIG. 5B shows a state transition diagram for a trellis type sequence detector matched to a PR4 target $1-D^2$. The branches connecting the states in the PR4 state transition diagram of FIG. 5B are labeled with y/x, where y represents the recorded binary data (NRZ encoded) and x represents the corresponding expected signal sample. FIG. 5C shows a trellis corresponding to the PR4 state transition diagram, wherein at any given state, a branch metric is computed (e.g., a Euclidean metric) representing a likelihood of the next recorded bit is a "0" or a "1" given the previous sequence of equalized signal samples. As the bits in the read signal are evaluated, a number of survivor sequences are tracked through the corresponding trellis which eventually merge into a most likely data sequence based on the accumulated branch metrics for each survivor sequence.

In one embodiment, the branch metric generated for each bit of the recorded sequence may represent the quality metric in the embodiment of FIG. 3B such that the stored sequence of signal samples may be updated at a bit resolution after reading a codeword at the different radial offsets. In another embodiment in order to reduce the computation memory, time, and complexity, a quality metric may be generated for a number of bits, or a number of bytes, for example, by averaging the branch metric generated for each bit over a number of the bits. That is, each quality metric shown in FIG. 3B may be generated over a segment of the codeword comprising a number of bits or a block of bytes. In yet another embodiment, the control circuitry may adjust the resolution for the quality metrics in order to increase the correction power during an heroic error recovery procedure. For example, the control circuitry may initially generate each quality metric over a relatively large block of bytes. If the error recovery procedure described above fails to recover the codeword, the control circuitry may re-execute the recovery procedure after increasing the resolution of the quality metrics (i.e., by generating each quality metric over a fewer number of bytes or bits).

Referring again to FIG. 5A, in one embodiment the trellis type sequence detector 54 may generate soft decisions for each bit of the recorded sequence, such as with a SOVA detector. The soft decisions output by the trellis detector 54 may be stored in the samples buffer 52 and processed by the iterative decoder 56. In this embodiment, the quality metrics shown in FIG. 3B may be used to update the soft decisions in the samples buffer 52 when reading the codeword at different radial locations. In other words, the phrase "signal samples" may in one embodiment mean the actual signal samples (or equalized signal samples) of the read signal, and in another embodiment the term may mean soft decisions (including log-likelihood ratios) that may be generated by the trellis type detector 54, the iterative decoder 56, or any other suitable soft decision detector/decoder.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a head actuated over the disk; and
control circuitry configured to:
  position the head at a first radial location over the disk and read at least part of a codeword on the disk to generate first signal samples;
  generate a first quality metric for the first signal samples;
  position the head at a second radial location over the disk different from the first radial location and read at least part of the codeword to generate second signal samples;
  generate a second quality metric for the second signal samples;
  combine a first subset of the first signal samples with a second subset of the second signal samples based on the first and second quality metrics to generate a combined set of signal samples; and
  first attempt to decode the codeword based on the combined set of signal samples.

2. The data storage device as recited in claim 1, wherein when the second quality metric indicates a better quality than the first quality metric, the control circuitry is further configured to generate the combined set of signal samples using at least part of the second signal samples corresponding to the second quality metric.

3. The data storage device as recited in claim 1, wherein the control circuitry is further configured to:
position the head at a third radial location over the disk different from the first and second radial locations and read at least part of the codeword to generate third signal samples;
generate a third quality metric for the third signal samples;
modify the combined set of signal samples using the third signal samples based on the third quality metric; and
second attempt to decode the codeword based on the modified combined set of signal samples.

4. The data storage device as recited in claim 3, wherein when the third quality metric indicates a better quality than the first and second quality metrics, the control circuitry is further configured to modify the combined set of signal samples using at least part of the third signal samples corresponding to the third quality metric.

5. The data storage device as recited in claim 1, wherein the control circuitry is further configured to:
generate the first quality metric over a first plurality of the first signal samples; and
generate the second quality metric over a second plurality of the second signal samples.

6. The data storage device as recited in claim 5, wherein the control circuitry is further configured to:
generate the first quality metric based on a first difference between one of the first signal samples and an expected signal sample; and
generate the second quality metric based on a second difference between one of the second signal samples and an expected signal sample.

7. The data storage device as recited in claim 6, wherein the first difference corresponds to a branch metric of a trellis type sequence detector.

8. The data storage device as recited in claim 7, wherein the control circuitry is further configured to generate the first quality metric based on a plurality of branch metrics generated by the trellis type sequence detector over a plurality of the first signal samples.

9. The data storage device as recited in claim 1, wherein the control circuitry is further configured to:
generate the first quality metric based on a first difference between one of the first signal samples and an expected signal sample; and
generate the second quality metric based on a second difference between one of the second signal samples and an expected signal sample.

10. The data storage device as recited in claim 9, wherein the first difference corresponds to a branch metric of a trellis type sequence detector.

11. A method of operating a data storage device, the method comprising;
positioning a head at a first radial location over a disk and reading at least part of a codeword on the disk to generate first signal samples;
generating a first quality metric for the first signal samples;
positioning the head at a second radial location over the disk different from the first radial location and reading at least part of the codeword to generate second signal samples;
generating a second quality metric for the second signal samples;
combining a first subset of the first signal samples with a second subset of the second signal samples based on the first and second quality metrics to generate a combined set of signal samples; and
first attempting to decode the codeword based on the combined set of signal samples.

12. The method as recited in claim 11, wherein when the second quality metric indicates a better quality than the first quality metric, further comprising generating the combined set of signal samples using at least part of the second signal samples corresponding to the second quality metric.

13. The method as recited in claim 11, further comprising:
positioning the head at a third radial location over the disk different from the first and second radial locations and reading at least part of the codeword to generate third signal samples;
generating a third quality metric for the third signal samples;
modifying the combined set of signal samples using the third signal samples based on the third quality metric; and
second attempting to decode the codeword based on the modified combined set of signal samples.

14. The method as recited in claim 13, wherein when the third quality metric indicates a better quality than the first and second quality metrics, further comprising modifying the combined set of signal samples using at least part of the third signal samples corresponding to the third quality metric.

15. The method as recited in claim 11, further comprising:
generating the first quality metric over a first plurality of the first signal samples; and
generating the second quality metric over a second plurality of the second signal samples.

16. The method as recited in claim 15, further comprising:
generating the first quality metric based on a first difference between one of the first signal samples and an expected signal sample; and
generating the second quality metric based on a second difference between one of the second signal samples and an expected signal sample.

17. The method as recited in claim 16, wherein the first difference corresponds to a branch metric of a trellis type sequence detector.

18. The method as recited in claim 17, further comprising generating the first quality metric based on a plurality of branch metrics generated by the trellis type sequence detector over a plurality of the first signal samples.

19. The method as recited in claim 11, further comprising:
generating the first quality metric based on a first difference between one of the first signal samples and an expected signal sample; and
generating the second quality metric based on a second difference between one of the second signal samples and an expected signal sample.

20. The method as recited in claim 19, wherein the first difference corresponds to a branch metric of a trellis type sequence detector.

* * * * *